United States Patent
Ravindran et al.

(10) Patent No.: US 11,880,401 B2
(45) Date of Patent: Jan. 23, 2024

(54) TEMPLATE GENERATION USING DIRECTED ACYCLIC WORD GRAPHS

(71) Applicant: YAHOO ASSETS LLC, Dulles, VA (US)

(72) Inventors: Srinath Ravindran, Santa Clara, CA (US); Mahmoudreza Abasi, Chesterfield, MO (US); Narayan Bhamidipati, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 17/721,684

(22) Filed: Apr. 15, 2022

(65) Prior Publication Data
US 2022/0237220 A1   Jul. 28, 2022

Related U.S. Application Data

(63) Continuation of application No. 16/232,107, filed on Dec. 26, 2018, now Pat. No. 11,308,141.

(51) Int. Cl.
*G06F 16/35* (2019.01)
*G06F 7/08* (2006.01)
(Continued)

(52) U.S. Cl.
CPC .............. *G06F 16/353* (2019.01); *G06F 7/08* (2013.01); *G06F 16/322* (2019.01);
(Continued)

(58) Field of Classification Search
CPC .... G06F 16/353; G06F 16/322; G06F 16/328; G06F 16/335; G06F 16/9024; G06F 7/08
See application file for complete search history.

(56) References Cited

U.S. PATENT DOCUMENTS 8,326,806 B1 * 12/2012 Baratloo ................ G06Q 30/02
                                                              707/688
8,335,719 B1    12/2012 Quraishi et al.
(Continued)

OTHER PUBLICATIONS

Google Product Taxonomy. https://support.google.com/merchants/answer/6324436?hl=en.
(Continued)

*Primary Examiner* — Robert W Beausoliel, Jr.
*Assistant Examiner* — Susan F Rayyan
(74) *Attorney, Agent, or Firm* — James J. DeCarlo; Greenberg Traurig, LLP

(57) ABSTRACT

Technologies for template generation using directed acyclic word graphs (DAWGs). The technologies can include receiving a first plurality of titles from a first plurality of title feeds, and sorting the first plurality of titles into a plurality of category sets. And, for each category set of the plurality of category sets, the technologies can include transforming the respective titles belonging to the category set into a trie data structure by separating words in the respective titles into nodes of the trie data structure. For each category set, the technologies can also include transforming the trie data structure into a directed acyclic word graph (DAWG) data structure. Also, for each category set, the technologies can also include generating one or more unique templates based on the DAWG data structure.

20 Claims, 5 Drawing Sheets

(51) Int. Cl.
  G06F 16/31 (2019.01)
  G06F 16/901 (2019.01)
  G06F 16/335 (2019.01)
(52) U.S. Cl.
  CPC .......... *G06F 16/328* (2019.01); *G06F 16/335* (2019.01); *G06F 16/9024* (2019.01)

(56) References Cited

U.S. PATENT DOCUMENTS

| | | | |
|---|---|---|---|
| 9,646,107 | B2 | 5/2017 | LeTourneau |
| 11,487,796 | B2* | 11/2022 | Holub .................. G06F 16/3338 |
| 2003/0237096 | A1* | 12/2003 | Barrett .................. H04N 21/47 707/E17.012 |
| 2007/0143317 | A1* | 6/2007 | Hogue .................. G06F 16/353 |
| 2007/0260595 | A1 | 11/2007 | Beatty et al. |
| 2008/0120292 | A1* | 5/2008 | Sundaresan .......... G06F 16/951 707/999.005 |
| 2010/0169311 | A1 | 7/2010 | Tengli et al. |
| 2010/0268724 | A1* | 10/2010 | Nevidomski ..... G06F 16/90344 707/E17.066 |
| 2012/0005234 | A1 | 1/2012 | Tago et al. |
| 2012/0078731 | A1 | 3/2012 | Linevsky et al. |
| 2012/0095990 | A1* | 4/2012 | Lambov ............ G06F 16/90344 707/719 |
| 2013/0262485 | A1 | 10/2013 | Li et al. |
| 2014/0201247 | A1 | 7/2014 | Kiraci et al. |
| 2017/0132206 | A1 | 5/2017 | Kumagai et al. |
| 2018/0357280 | A1 | 12/2018 | Brief et al. |
| 2018/0373692 | A1* | 12/2018 | Liu ........................ G06N 20/20 |
| 2019/0050744 | A1 | 2/2019 | Bharti et al. |
| 2019/0108285 | A1 | 4/2019 | Stillwell et al. |
| 2020/0042614 | A1* | 2/2020 | Fisher .................. G06F 16/9024 |
| 2020/0067861 | A1* | 2/2020 | Leddy .................. G06F 21/6245 |
| 2020/0117735 | A1 | 4/2020 | Berres |

OTHER PUBLICATIONS

Blumer, J. et al. "The smallest automation recognizing the subwords of a text," Theoretical Computer Science 40, pp. 31-55 (1985).
Samuel Brody and Noemie Elhadad, "An Unsupervised Aspect-sentiment Model for Online Reviews," In Human Language Technologies: The 2010 Annual Conference of the North American Chapter of the Association for Computational Linguistics (HLT '10). Association for Computational Linguistics, Stroudsburg, PA, USA, pp. 804-812 (2010).
Laura Chiticariu et al., "Domain Adaptation of Rule-based Annotators for Named-entity Recognition Tasks," In Proceedings of the 2010 Conference on Empirical Methods in Natural Language Processing (EMNLP '10). Association for Computational Linguistics, Stroudsburg, PA, USA, pp. 1002-1012 (2010).
Jan Daciuk et al., "Incremental Construction of Minimal Acyclic Finite-state Automata," Comput. Linguist. 26, 1, pp. 3-16 (2000).
Shunsuke Inenaga et al., "On-line construction of compact directed acyclic word graphs," Discrete Applied Mathematics 146, 2, pp. 156-179 (2005).
John D. Lafferty et al., "Conditional Random Fields: Probabilistic Models for Segmenting and Labeling Sequence Data," In Proceedings of the Eighteenth International Conference on Machine Learning (ICML '01). Morgan Kaufmann Publishers Inc., San Francisco, CA, USA, pp. 282-289 (2001).
Bodhisattwa Prasad Majumder et al., "Deep Recurrent Neural Networks for Product Attribute Extraction in eCommerce," CoRR abs/1803.11284 (2018).
Ajinkya More, "Attribute Extraction from Product Titles in eCommerce," abs/1608.04670 (2016).
David Nadeau and Satoshi Sekine, "A survey of named entity recognition and classification," Linguisticae Investigationes, 30, 1, pp. 3-26 (2007).
Duangmanee (Pew) Putthividhya and Junling Hu, "Bootstrapped Named Entity Recognition for Product Attribute Extraction," In Proceedings of the Conference on Empirical Methods in Natural Language Processing (EMNLP '11). Association for Computational Linguistics, Stroudsburg, PA, USA, pp. 1557-1567 (2011).
Charles Sutton and Andrew McCallum, "An Introduction to Conditional Random Fields," Found. Trends Mach. Learn. 4, 4, pp. 267-373 (2012).
Vikas Yadav and Steven Bethard, "A Survey on Recent Advances in Named Entity Recognition from Deep Learning models," In Proceedings of the 27th International Conference on Computational Linguistics (2018).
Guineng Zheng et al., "OpenTag: Open Attribute Value Extraction from Product Profiles," In Proceedings of the 24th ACM SIGKDD International Conference on Knowledge Discovery & Data Mining (KDD '18). ACM, New York, NY, USA, pp. 1049-1058 (2018).
Comon, Hubert et al., "Tree Automata Techniques and Applications," Sec. 1.5, p. 36 (2018).
https://github.com/kzn/fsa.
http://dawg.readthedocs.io/en/latest/#.
https://github.com/chalup/dawggenerator.

* cited by examiner

TEMPLATE GENERATION USING DIRECTED ACYCLIC WORD GRAPHS

CROSS REFERENCE TO RELATED APPLICATIONS

This application is a continuation of and claims priority from U.S. patent application Ser. No. 16/232,107, filed Dec. 26, 2018, entitled TEMPLATE GENERATION USING DIRECTED ACYCLIC WORD GRAPHS, issued as U.S. Pat. No. 11,308,141 on Apr. 19, 2022, and entitled TEMPLATE GENERATION USING DIRECTED ACYCLIC WORD GRAPHS, the contents of each of which is hereby incorporated by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to template generation using directed acyclic word graphs (DAWGs).

BACKGROUND

Entity resolution and developing a deeper understanding of entity titles (such as product titles) across the Internet is valuable in several applications ranging from search engines to analytics. Unfortunately, entity titles (such as product titles) are not standardized over the Internet for the most part. The titles lack structure and have several variations, including variation in spelling and sequence. Some websites allow human generated titles for products or services, which often causes a lot of variance. And, even among sophisticated websites that are more automated, there is still variance in entity and product titles.

In a typical entity resolution setting, a developer can train models to assign labels that identify common parts of a certain type of entity title. Such models are considered supervised models and can use conditional random fields (CRFs).

For a product title there are common parts, such as 'Brand', 'Product Name', 'Shape', and 'Size'. The product names usually stem from templatized rules that standardize representation of entities. Unfortunately, the templates tend to vary from website to website. It is possible to represent such variants through a common aggregated item name through entity extraction. Entity extraction can be used to identify similar product by extracting different parts of a product title. The products can then be grouped using the entity labels. Supervised learning techniques can be used for such tasks.

Most common supervised learning approaches use sequential labeling and other technologies (such as CRFs) to assign labels to the tokens. Most sequence based approaches are interested in attribute extraction from product titles, such as product titles that include 'Brand', 'Product Name', 'Shape', and 'Size'. While supervised learning approaches can learn labels, they have to be constantly retrained with new label data to capture new products or variations in entity titles. This problem can be due to a rigidity of supervised learning in that it is sequential. This can make training supervised models challenging. Further, product titles are not as standardized as one may expect; thus, titles often lack structure and have much variation.

Variation in entity and product titles can be a result of several factors. Different websites can follow their own naming scheme, even if such websites are selling or promoting the same product or service. Moreover, open marketplaces allow sellers to name their products, leading to greater variation as well.

A few approaches have attempted to resolve the aforesaid variation issues starting with a supervised sequential learning approach to obtain an initial set of labeled items, then using a bootstrapping approach to grow the initial set. Such semi-supervised approaches are helpful when handling large datasets with high levels of variations in entity and product titles, but do not solve the variation issue. While the variation issue has been studied and understood as a part of active learning and semi-supervised learning research, few supervised or semi-supervised approaches can solve the overwhelming variation issue due to rigidity in these approaches in that they are sequential based.

On the other hand, unsupervised approaches tend to be based on a bag of words, and such models, unlike their supervised learning counter parts, do not consider the sequence of words in the entity and product titles. This more flexible approach may seem beneficial, but it can be hard to obtain a coherent label using the output from bag of words models as they lose the sentence-like structure in a title. Moreover, while such approaches are effective in capturing the head terms of a title, clustering of such models fails in consolidating the tail terms.

Alternative approaches to entity recognition from titles include dictionary based lookups and rule based extractions. These techniques have been applied with limited success as well; and even when successful, their usage is restricted to cover smaller datasets. Thus, technical problems persist that prevent search, e-commerce, research, and other data extraction based applications less efficient and effective.

SUMMARY

Described herein are improved systems and methods for template generation using directed acyclic word graphs (DAWGs), which can overcome at least the technical problems mentioned in the background section above, such as the variation issues that have not been remedied by supervised and semi-supervised data extraction models.

Disclosed herein is an unsupervised approach that can use a DAWG to group similar entity titles (such as product titles) and to summarize the variation in the titles. The variations provided through a DAWG can reduce mislabeling commonly associated with supervised approaches as well as essentially eliminate or at least reduce variance in titles. This is very useful in improving efficiency and effectiveness in many technical applications such as applications ranging from search engines to e-commerce to recommendation systems to analytics that can depend on some form of entity extraction.

DAWG can be used to group similar entity titles in a scalable way. And, the grouping can limit variance in entity titles virtually; and thus, improve technical applications reliant on entity titles and that are improved when variance is reduced or eliminated in entity titles. The technologies described herein can be applied to such applications and virtually reduce variance in entity titles through grouping the titles according to templates that are generated using DAWGs.

In general, the unsupervised approach disclosed herein is meant to operate on millions of entity and product titles as there are as many in reality due to the variations from website to website and feed to feed. The disclosed technical solution ensures that the items that can be combined together are part of a same trie. In addition to the unsupervised approach using DAWG described herein DAWG can be applied to only the most frequent or common item names (also referred to as the head of a title). In some embodiments, partial and/or entire titles can be applied to the DAWG based approach disclosed herein.

Also, templates can be extracted from the DAWG data structure and applied to various applications such as search and analytics. Once equipped with DAWG canonicalized templates, the methods and systems can match any item or title to one or more templates. Regular expression matching of the token words can be used.

In summary, examples of the systems and methods disclosed herein for template generation using DAWGs provide specific technical solutions to at least overcome the technical problems mentioned in the background section and other parts of the application as well as other technical problems not described herein but recognized by those of skill in the art.

In accordance with one or more embodiments, this disclosure provides computerized methods for template generation using DAWGs, as well as a non-transitory computer-readable storage medium for carrying out technical steps of the computerized methods. The non-transitory computer-readable storage medium has tangibly stored thereon, or tangibly encoded thereon, computer readable instructions that when executed by one or more devices (e.g., one or more servers) cause at least one processor to perform a method for a novel and improved template generation using DAWGs.

In accordance with one or more embodiments, a system is provided that includes one or more computing devices configured to provide functionality in accordance with one or more embodiments of a novel and improved way of template generation using DAWGs.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
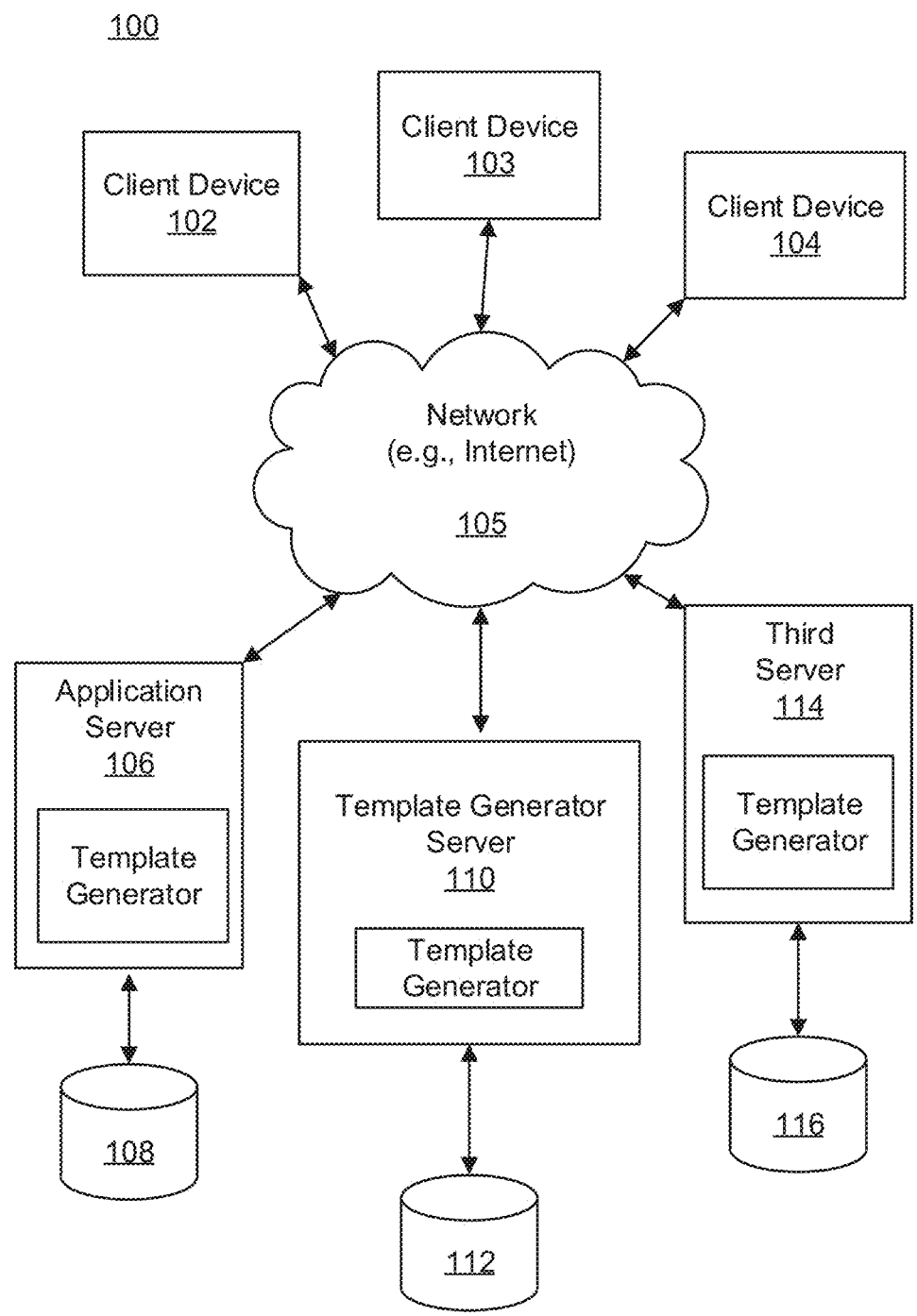
FIG. 1 is a schematic diagram illustrating an example of a network (which includes elements that can implement template generation using DAWGs) within which systems and methods disclosed herein can be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/ acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that can couple devices so that communications can be exchanged, such as between a server and a client device or other types of devices, including between wireless devices coupled via a wireless network, for example. A network can also include mass storage, such as network attached storage (NAS), a storage area network (SAN), or other forms of computer or machine-readable media, for example. A network can include the Internet, one or more local area networks (LANs), one or more wide area networks (WANs), wire-line type connections, wireless type connections, cellular or any combination thereof. Likewise, sub-networks, which can employ differing architectures or can be compliant or compatible with differing protocols, can interoperate within a larger network. Various types of devices can, for example, be made available to provide an interoperable capability for differing architectures or protocols. As one illustrative example, a router can provide a link between otherwise separate and independent LANs.

A communication link or channel can include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as can be known to those skilled in the art. Furthermore, a computing device or other related electronic devices can be remotely coupled to a network, such as via a wired or wireless line or link, for example.

A computing device can be capable of sending or receiving signals, such as via a wired or wireless network, or can be capable of processing or storing signals, such as in memory as physical memory states, and can, therefore, operate as a server. Thus, devices capable of operating as a server can include, as examples, dedicated rack mounted servers, desktop computers, laptop computers, set top boxes, integrated devices combining various features, such as two or more features of the foregoing devices, or the like. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device can include a computing device capable of sending or receiving signals, such as via a wired or a wireless network. A client device can, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device can vary in terms of capabilities or features. Claimed subject matter is intended to cover a wide range of potential variations. For example, a simple smart phone, phablet or tablet can include a numeric keypad or a display of limited functionality, such as a monochrome liquid crystal display (LCD) for displaying text. In contrast, however, as another example, a web-enabled client device can include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device can include or can execute a variety of operating systems, including a personal computer operating system, such as a Windows, iOS or Linux, or a mobile operating system, such as iOS, Android, or Windows Mobile, or the like.

A client device can include or can execute a variety of possible applications, such as a client software application enabling communication with other devices, such as communicating one or more messages, such as via email, for example Yahoo® Mail, short message service (SMS), or multimedia message service (MMS), for example Yahoo® Messenger®, including via a network, such as a social network, including, for example, Tumblr®, Facebook®, LinkedIn®, Twitter®, Flickr®, or Google+®, Instagram™, to provide only a few possible examples. A client device can also include or execute an application to communicate content, such as, for example, textual content, multimedia content, or the like. A client device can also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

In developing a model to consolidate variations in entity and product titles, it is important to consider the following requirements: ability to cover multiple variations across several websites, scalability to cover millions of entity and product titles, and ability to capture future variations. Disclosed herein is an unsupervised approach using directed acyclic word graphs (DAWGs) in a certain way to handle the variations in entity and product titles and attempt to comply with the aforesaid requirements.

An example objective of the technical solution described herein is not only to capture existing or historical variations in entity and product titles, but to also enable consolidation of future variants of the same entity, product or service promoted online. The word graph based process described herein can capture existing variations; and, templates extracted from the word graphs can be used to consolidate unseen future examples. Titles of the same entity, product or service have several words in common, mostly occurring in the same order or along with the same neighboring words. Typically, the variations in the titles are either the attributes or the model versions. Since websites often have standard templatized representations of entity, product or service names, the location of such variations within a title for a given entity, product or service often follows a pattern.

Figure 5:
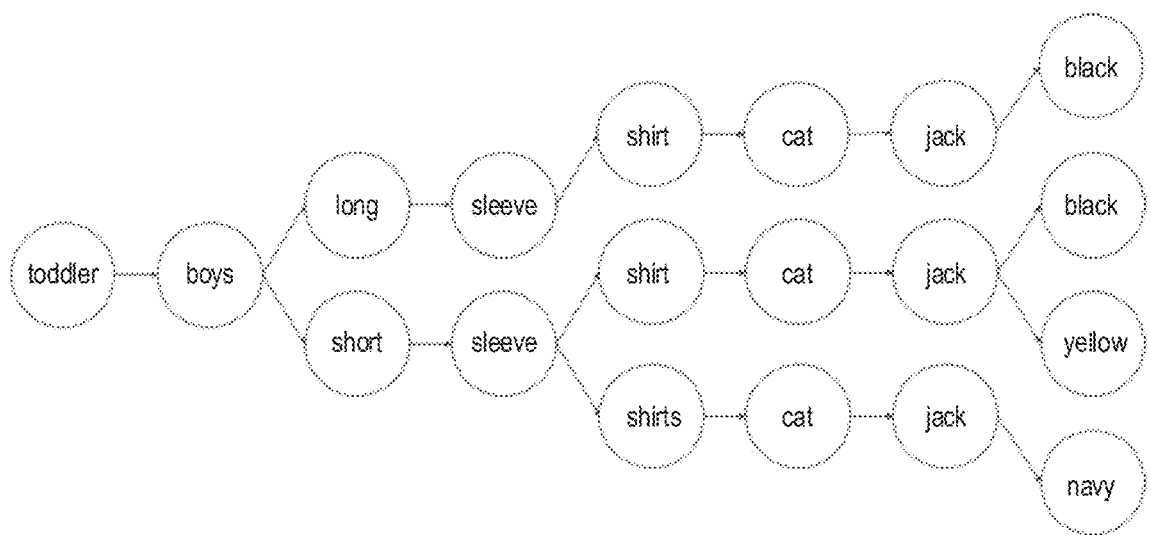
FIG. 5 illustrates a normalized trie data structure, in accordance with some embodiments of the present disclosure.
Figure 6:
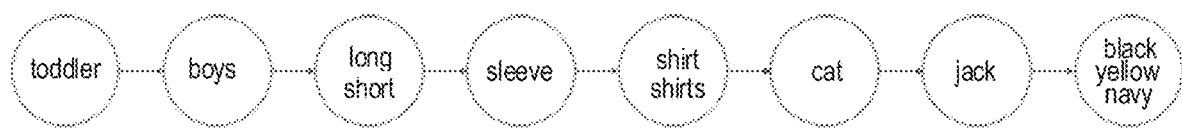
FIG. 6 illustrates a DAWG data structure based on the normalized trie data structure depicted in FIG. 5, in accordance with some embodiments of the present disclosure.

For example, consider the following original item names: "toddler boys short sleeve shirt cat jack yellow", "toddler boys long sleeve shirt cat jack black", "toddler boys short sleeve shirts cat jack navy", and "toddler boys short sleeve shirt cat jack black". These names can be consolidated into a common name, "toddler boys {long, short} sleeve {shirt, shirts} cat jack {black, navy, yellow}". FIG. 5 shows a visual representation of a normalized word tree formed using the aforesaid original item names. In fact, this is a special kind of tree called a suffix tree or a trie. FIG. 6 shows another type of trie that represents the consolidated string, "toddler boys {long, short} sleeve {shirt, shirts} cat jack {black, navy, yellow}". This consolidated string can be considered an illustration of a DAWG.

The consolidated string is a compact representation of all of the titles represented by the trie. Such a compact representation constructed using suffix trees can be considered a DAWG. Such a data structure can allow faster searches than other and more conventional tree data structures. The DAWG is sometimes referred to as a deterministic acyclic finite state automaton (DAFSA). For the purposes of this disclosure, a DAWG can be or include a DAFSA and represent suffixes of a given string in which each edge is labeled with a character or a word. The characters or words along a path from the root to a node are the substring which the node represents. Traditionally, this approach is used to represent a compact version of a trie. A trie uses a node for each occurrence of a term, whereas a DAFSA takes eliminates redundancy occurring in such a trie. DAWG is a compact representation of the corresponding trie since it uses fewer nodes to represent the same set of words. In some embodiments described herein, the system applies DAWG to complete title phrases or the heads of titles, and each node of the trie or the DAWG represents a word token in a title or a head of a title.

The technologies described herein can include a process that starts with a normalized trie representation of item names (such as shown in FIG. 5). The initial trie can include nodes that capture word tokens and edges that represent the ordering. Also, terms can be coalesced as long as the preceding terms and the succeeding terms are identical across all the sentences in the trie. In the trie, this translates to the parent and the child nodes linked to a given node. For instance, for all unordered pairs of node children, if their associated children are set-equivalent, the two node children can be coalesced. If the pair of node children are childless, they can also be coalesced. By recursively applying the last two mentioned collapsing rules, the system can derive a DAWG as shown in FIG. 6.

Certain embodiments will now be described in greater detail with reference to the FIGS. 1-6. In general, with reference to FIG. 1, a system 100 in accordance with an embodiment of the present disclosure is shown. FIG. 1 shows components of a general environment in which the systems and methods discussed herein can be practiced. Not all the components can be required to practice the disclosure, and variations in the arrangement and type of the components can be made without departing from the spirit or scope of the disclosure. As shown, system 100 of FIG. 1 includes local area networks ("LANs")/wide area networks ("WANs")—network 105 and client devices 102-104 (e.g., such as handheld or mobile devices, Internet of Things devices, etc.). Applications used by the client devices 102-104 can be served by the servers illustrated in FIG. 1, and such applications can be enhanced by a template generator that can implement template generation using DAWGs. The structure of the template generator is further described with reference to template generator 244 depicted in FIG. 2.

As shown, system 100 of FIG. 1 also includes application server 106 communicatively coupled to database 108 used by the application server, and template generator server 110 that can persistently store the template generator described herein and can provide the template generator to other computing devices for being stored in memory of those devices or persistently stored in those devices. Also, as shown, system 100 of FIG. 1 includes database 112 communicatively coupled to template generator server 110 and used by the template generator server, and a third server 114 communicatively coupled to database 116 use by the third server. The databases described herein can be used by the servers to select, store and organize data used as input for the processes described herein. For example, the feeds described herein can be from one or more of the databases described herein. The client devices described herein can also select and use the data stored and organized in the databases as input for the processes described herein.

It is to be understood that the processes described herein can be executed by one or more of the client devices and servers disclosed herein. Specifically, for example, each of the servers 106, 110, and 114 can include a device that includes a configuration to perform at least some of the operations of process 300 depicted in FIG. 3 and process 400 illustrated in FIG. 4. Also, for example, each of the client devices 102-104 can include a device that includes a configuration to perform at least some of the operations of processes 300 and 400. Example embodiments of client devices 102-104 and servers 106, 110, and 114 are described in more detail below.

Generally, client devices 102-104 can include virtually any computing device capable of receiving and sending a message over a network, such as network 105—which could include a wireless network—, or the like. Client devices 102-104 can also be mobile devices that are configured to be portable and held in a hand or two hands. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices typically range widely in terms of capabilities and features. For example, a cell phone can have a numeric keypad and a few lines of monochrome LCD display on which only text can be displayed. In another example, a web-enabled mobile device can have a touch sensitive screen, a stylus, and an HD display in which both text and graphics can be displayed.

A web-enabled client device can include a browser application that is configured to receive and to send web pages, web-based messages, and the like. The browser application can be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client devices 102-104 and the servers 106, 110, and 114 can each include at least one client application that is configured to receive content or data from another computing device. The client application can include a capability to provide and receive textual content, graphical content, audio content, authentication and keying information, and the like. The client application can further provide information that identifies itself, including a type, capability, name, and the like. In one embodiment, client devices 102-104 and the servers 106, 110, and 114 can each uniquely identify themselves through any of a variety of mechanisms. Client devices can be identifiable via a phone number, Mobile Identification Number (MIN), an electronic serial number (ESN), or another type of device identifier. Servers can be identifiable via an electronic serial number (ESN) or another type of device identifier.

In general, client devices 102-104 and servers 106, 110, and 114 can be capable of sending or receiving signals, such as via a wired or wireless network, or can be capable of processing or storing signals, such as in memory as physical memory states.

Network 105 is configured to couple devices 102-104 and servers 106, 110, and 114, or the like, with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, can be compatible with or compliant with one or more protocols. Signaling formats or protocols employed can include, for example, TCP/IP, UDP, QUIC (Quick UDP Internet Connection), DECnet, Net-BEUI, IPX, APPLETALK™, or the like. Versions of the Internet Protocol (IP) can include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets can be communicated between nodes of a network, such as, for example, to one or more sites employing a local network address. A signal packet can, for example, be communicated over the Internet from a user site via an access node coupled to the Internet. Likewise, a signal packet can be forwarded via network nodes to a target site coupled to the network via a network access node, for example. A signal packet communicated via the Internet can, for example, be routed via a path of gateways, servers, etc. that can route the signal packet in accordance with a target address and availability of a network path to the target address.

In some embodiments, the network 105 can include content distribution network(s) and/or application distribution network(s). A content distribution network (CDN) or an application distribution network (ADN) generally refers to a delivery system that includes a collection of computers or computing devices linked by a network or networks. A CDN or ADN can employ software, systems, protocols or techniques to facilitate various services, such as storage, caching, communication of content, or streaming media or applications. A CDN or ADN can also enable an entity to operate or manage another's site infrastructure, in whole or in part.

The servers 106, 110, and 114 can include a device that includes a configuration to provide content such as interactive content via a network to another device. Such server(s) can, for example, host a site, service or an associated application, such as, an email platform (e.g., Yahoo® Mail), a social networking site, a photo sharing site/service (e.g., Tumblr®), a search platform or site, or a personal user site (such as a blog, vlog, online dating site, and the like) and the like. Such server(s) can also host a variety of other sites, including, but not limited to business sites, educational sites, dictionary sites, encyclopedia sites, wikis, financial sites, government sites, and the like. Devices that can operate as such server(s) include personal computers desktop computers, multiprocessor systems, microprocessor-based or programmable consumer electronics, network PCs, servers, and the like.

The servers 106, 110, and 114 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content can include videos, text, audio, images, or the like, which can be processed in the form of physical signals, such as electrical signals, for example, or can be stored in memory, as physical states, for example.

Also, servers 106, 110, and 114 can include an ad server such as a server that stores online advertisements for presentation to users. "Ad serving" provided by an ad server refers to methods used to place online advertisements on websites, in applications, or other places where users are more likely to see them, such as during an online session or during computing platform use, for example. Various monetization techniques or models can be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

Servers 106, 110, and 114 can be capable of sending or receiving signals, such as via a wired or wireless network, or can be capable of processing or storing signals, such as in memory as physical memory states. Devices capable of operating as a server can include, as examples, dedicated rack-mounted servers, desktop computers, laptop computers, set top boxes, integrated devices combining various features, such as two or more features of the foregoing devices, or the like. Servers can vary widely in configuration or capabilities, but generally, a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 110, and 114. This can include in a non-limiting example, authentication servers, search servers, email servers, social networking services servers, SMS servers, IM servers, MMS servers, exchange servers, photo-sharing services servers, and travel services servers, via the network 105 using their various client devices. In some embodiments, applications, such as a mail or messaging application (e.g., Yahoo® Mail, Yahoo® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo® Search), and the like, can be hosted by servers 106, 110, and 114. Thus, servers 106, 110, and 114 can store various types of applications and application related information including application data and user profile information (e.g., identifying and behavioral information associated with a user). It should also be understood that servers 106, 110, and 114 can also store various types of data related to content and services provided by an associated database. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 110, and 114.

Moreover, although FIG. 1 illustrates servers 106, 110, and 114 as single computing devices, respectively, the disclosure is not so limited. For example, one or more functions of servers 106, 110, and 114 can be distributed across one or more distinct computing devices. Moreover, in one embodiment, servers 106, 110, and 114 can be integrated into a single computing device, without departing from the scope of the present disclosure.

Figure 2:
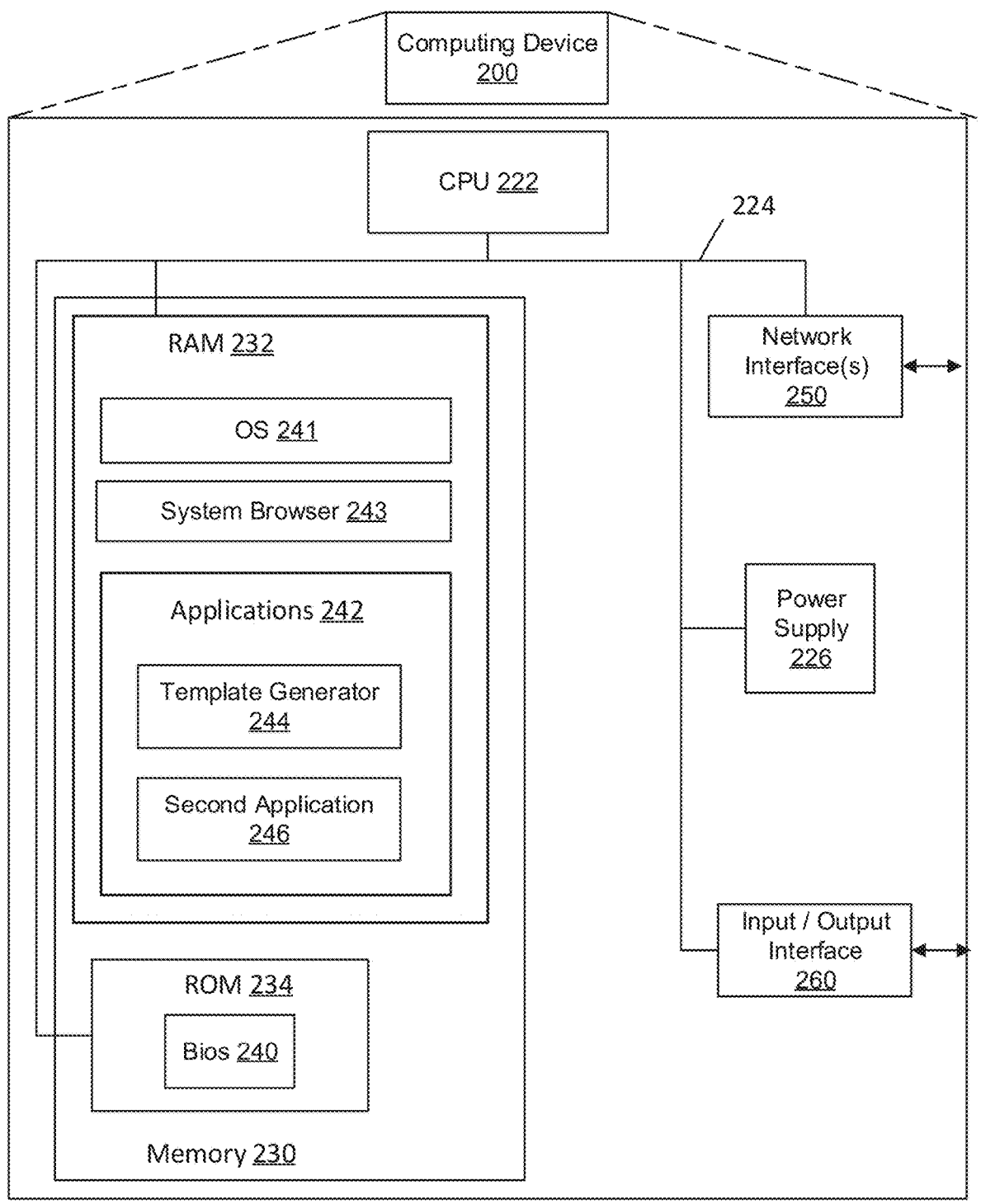
FIG. 2 is a schematic diagram illustrating an example of a computing device, in accordance with some embodiments of the present disclosure.

FIG. 2 is a schematic diagram illustrating a computing device 200 showing an example embodiment of a computing device that can be used within the present disclosure. The computing device 200 can include many more or less components than those shown in FIG. 2. However, the components shown are sufficient to disclose an illustrative embodiment for implementing some aspects the present disclosure. The computing device can represent, for example, any one or more of the servers or client devices discussed above in relation to FIG. 1.

As shown in the figure, computing device 200 includes a processing unit (CPU) 222 in communication with a mass memory 230 via a bus 224. Computing device 200 also includes a power supply 226, one or more network interfaces 250, and an input/output interface 260 (which can include an audio interface, a display, a keypad, an illuminator, a global positioning systems (GPS) receiver, sensors, and an input/output interface to such devices).

Power supply 226 provides power to computing device 200. A rechargeable or non-rechargeable battery can be used to provide power. The power can also be provided by an external power source, such as an AC adapter or a powered docking cradle that supplements and/or recharges a battery. Computing device 200 can optionally communicate with a base station (not shown), or directly with another computing device. Network interface 250 includes circuitry for coupling computing device 200 to one or more networks, and is constructed for use with one or more communication protocols and technologies as discussed above. Network interface 250 is sometimes known as a transceiver, transceiving device, or network interface card (NIC). The input/output interface 260 can be used for communicating with external devices. Input/output interface 260 can utilize one or more communication technologies, such as USB, infrared, Bluetooth™, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of computing device 200. The mass memory also stores an operating system 241 in RAM 232 for controlling the operation of computing device 200. It will be appreciated that this component can include a general-purpose operating system such as a version of UNIX, or LINUX™, or a specialized client communication operating system such as Windows Client™ or the Symbian® operating system. The operating system can include, or interface with a Java virtual machine module that enables control of hardware components and/or operating system operations via Java application programs.

The mass memory also stores a system browser in RAM 232 for controlling operations of a system browser 243 and applications 242, such as template generator 244 which can perform all or many of the operations described herein in relation to FIGS. 3-6. The applications 242 can also include second application 246 that can perform all or some of the steps of process 400 depicted in FIG. 4 as well as possibly some of the operations of process 300 in FIG. 3. In some embodiments, second application 246 can perform all or some of the steps of processes depicted in FIGS. 3-6 in conjunction with template generator 244.

The template generator 244 and/or the second application 242 can include, be a part of, or be a non-transitory computer-readable storage medium tangibly encoded with computer-executable instructions, that when executed by processing unit 222 of computing device 200, performs a method such as steps of process 300 or steps of process 400.

Memory 230 further includes one or more data stores, which can be utilized by computing device 200 to store, among other things, the system browser 243, the applications 242 and/or other data. For example, data stores can be employed to store information that describes various capabilities of computing device 200. The information can then be provided to another device based on any of a variety of events, including being sent as part of a header during a communication, sent upon request, or the like. At least a portion of the capability information can also be stored on a disk drive or other storage medium (not shown) within computing device 200.

Applications 242 can include computer executable instructions which, when executed by computing device 200 or any of the other servers described herein, transmit, receive, and/or otherwise process text, audio, video, images, and enable telecommunication with other servers and/or another user of another client device. Examples of application programs or "apps" in some embodiments include browsers, calendars, contact managers, task managers, transcoders, photo management, database programs, word processing programs, security applications, spreadsheet programs, games, search programs, and so forth.

In some embodiments, the computing device 200 can include a processor and a non-transitory computer-readable storage medium for tangibly storing thereon program logic for execution by the processor, the program logic having executable logic for performing the steps of process 300 or 400. For example, it can have executable logic for receiving a first plurality of entity and/or product titles from a first plurality of title feeds. It can have executable logic for removing duplicate copies of titles in the first plurality of titles so that the plurality of first titles is transformed into a plurality of unique titles. It can have executable logic for sorting the plurality of unique titles into a plurality of title category sets. For each category set of the plurality of category sets, the program logic can have executable logic for transforming the respective unique titles belonging to the category set into a trie data structure by separating words in the respective unique titles into nodes of the trie data structure. Each node of the trie data structure can include one word.

Also, for each title category set of the plurality of title category sets, the program logic can have executable logic for normalizing the trie data structure by at least removing duplicates in the trie data structure and executable logic for transforming the normalized trie data structure into a directed acyclic word graph (DAWG) data structure. The DAWG data structure can include a plurality of fixed nodes and a plurality of variable nodes, and each fixed node of the plurality of fixed nodes can include one fixed word. And, each variable node of the plurality of variable nodes can include a plurality of alternative words representing multiple alternative words for the variable node. Also, for each title category set of the plurality of title category sets, the program logic can have executable logic for generating one or more unique templates based on the DAWG data structure.

Additionally, for example, the program logic can have executable logic for receiving a second plurality of titles from the first plurality of title feeds and/or a second plurality of title feeds. Also, for each generated unique template of the generated unique templates of the plurality of title category sets, the program logic can have executable logic for searching the second plurality of titles by using the generated unique template as a regular expression to match one or more titles with the generated unique template. The program logic can have executable logic for performing an action according to the matched one or more titles. In some embodiments, the action can include associating, in a database, the matched one or more titles with the generated unique template (such as described with respect to step 408 of process 400.

Having described components of the architecture example employed within the disclosed systems and methods, the components' operations with respect to the disclosed systems and methods will now be described below with reference to FIGS. 3-6.

Figure 3:
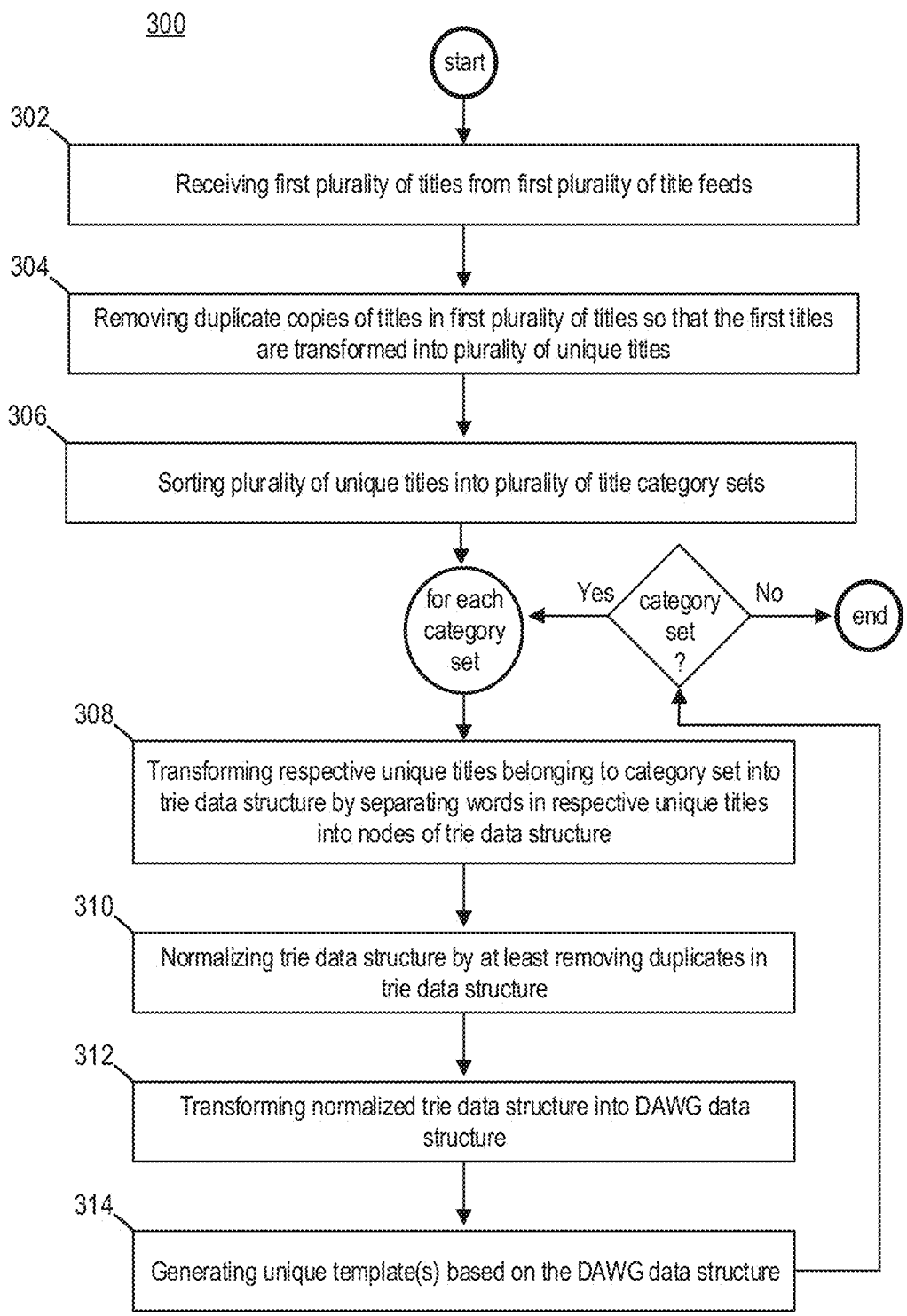
FIGS. 3 and 4 are flowcharts illustrating example methods, in accordance with some embodiments of the present disclosure.

In FIG. 3, process 300 details steps performed by one or more computing devices (such as one or more of the computing devices described herein), in accordance with some embodiments of the present disclosure. Specifically, the steps of process 300 can be performed by a template generator running on one or more computing devices (such as the template generator 244). The steps are for template generation using directed acyclic word graphs (DAWGs). Process 300 begins with step 302, which includes a template generator, such as template generator 244, or one or more other parts of one or more computing devices (such as computing device 200 depicted in FIG. 2), receiving a first plurality of entity and/or product titles from a first plurality of title feeds. The feeds can be received from one or more servers (e.g., servers 106, 110, and 114) or one or more client devices (e.g., client devices 102-104) over a network (such as network 105).

In step 304, the template generator (or one or more other parts of one or more computing devices) removes duplicate copies of titles in the first plurality of titles so that the plurality of first titles is transformed into a plurality of unique titles.

In step 306, the template generator (or one or more other parts of one or more computing devices) sorts the plurality of unique titles into a plurality of title category sets.

In step 308, the template generator (or one or more other parts of one or more computing devices), for each title category set of the plurality of title category sets, transforms the respective unique titles belonging to the title category set into a trie data structure by separating words in the respective unique titles into nodes of the trie data structure. Each node of the trie data structure can include one word. The transforming of the respective unique titles belonging to the title category set into the trie data structure can include generating sub-trie data structures of the trie data structure in parallel and/or simultaneously.

In step 310, the template generator (or one or more other parts of one or more computing devices), for each title category set of the plurality of title category sets, normalizes the trie data structure by at least removing duplicates in the trie data structure.

In step 312, the template generator (or one or more other parts of one or more computing devices), for each title category set of the plurality of title category sets, transforms the normalized trie data structure into a DAWG data structure. The DAWG data structure can include a plurality of fixed nodes and a plurality of variable nodes. Each fixed node of the plurality of fixed nodes can include one fixed word. And, each variable node of the plurality of variable nodes can include a plurality of alternative words representing multiple alternative words for the variable node.

In step 314, the template generator (or one or more other parts of one or more computing devices), for each title category set of the plurality of title category sets, generates one or more unique templates based on the DAWG data structure. As shown, if there is a category set that has not been processed, it will be processed according to steps 308-314. Also, as shown, if all the category sets have been processed according to steps 308-314, then process 300 ends until another plurality of titles from feeds is received for generating templates.

In general, the generating of the one or more unique templates based on the DAWG data structure can include including a certain number of wildcard parameters for a corresponding certain number of additional words into each unique template of the one or more unique templates, such that the unique template can be used as a certain n-gram. Specifically, for example, the generating of the one or more unique templates based on the DAWG data structure in step 314 can include including only two fixed words of two fixed nodes of the plurality of fixed nodes into each unique template of the one or more unique templates along with at least one wildcard parameter for one additional word. Also, the generating of the one or more unique templates based on the DAWG data structure can include including only one wildcard parameter for one additional word into each unique template of the one or more unique templates, such that the unique template can be used as a trigram. The generating the one or more unique templates based on the DAWG data structure can also include including only two wildcard parameters for two additional words into each unique template of the one or more unique templates, such that the unique template can be used as a 4-gram.

In some embodiments, for a given entity and/or product set, the following algorithm can generate a DAWG data structure alone or along with aspects of process 300. First, embed item names in a word-level trie structure, and preserving common prefix associations as shown in FIG. 5. Second, starting from the root node, follow a post-order depth-first traversal of the graph, performing a minimization check at each node. The check can include, for all unordered pairs of node children (n choose 2), if their associated children are set-equivalent, the two node children can be coalesced. And, if this pair of node children are childless, they can also be coalesced. The check can also include, combining siblings that are not identical, wherein the original trie did not have identically labeled siblings. The minimization check can also include, in the event of a coalesce operation and the subtree originating in root has been rearranged, iterate through the subtree to discover additional matches.

The resulting DAWG can allow representation of each original item name with a canon form composed of traversing the final graph through a path whose node labels match the item name tokens. For instance, the resulting collapse of the sample normalized trie in FIG. 5 can result in the DAWG as shown in FIG. 6. When the approach uses the entire dataset of titles as a trie, the approach can be parallelized since each sub-trie can be processed independently. Also, such a technique when only the heads of titles are parsed and transformed into DAWGs.

Figure 4:
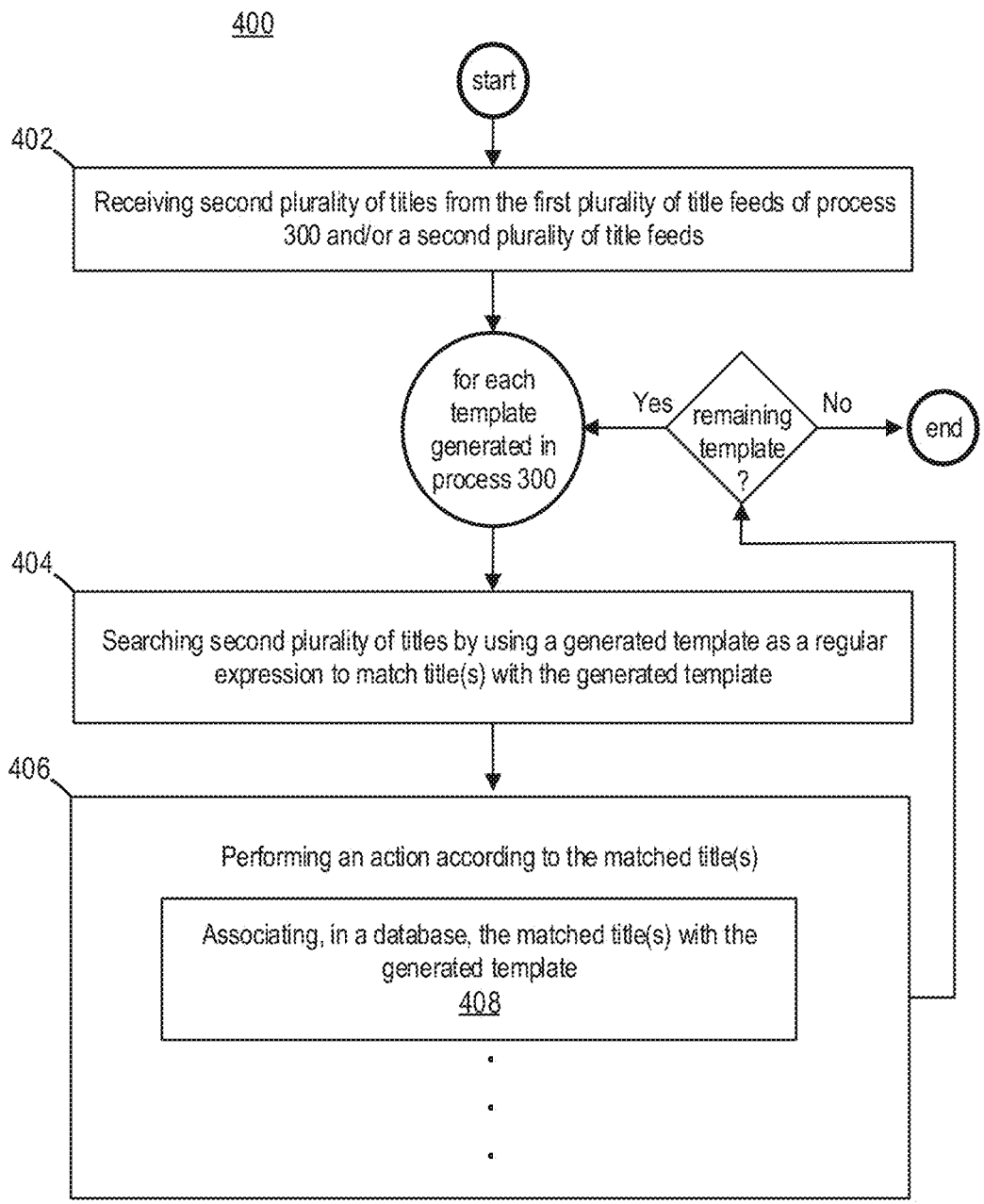

In FIG. 4, process 400 details steps performed by one or more computing devices (such as one or more of the computing devices described herein), in accordance with some embodiments of the present disclosure. Specifically, the steps of process 400 can be performed by a template generator or a second application running on one or more computing devices (such as the template generator 244 or second application 246). The steps are for uses of the templates generated in process 300. Process 400 begins with step 402, which includes a template generator, such as template generator 244, or a second application, such as second application 246, or one or more other parts of one or more computing devices (such as computing device 200 depicted in FIG. 2), receiving a second plurality of entity and/or product titles from the first plurality of title feeds from process 300 and/or a second plurality of title feeds. The feeds can be received from one or more servers (e.g., servers 106, 110, and 114) or one or more client devices (e.g., client devices 102-104) over a network (such as network 105).

In step 404, the template generator or the second application (or one or more other parts of one or more computing devices), for each generated unique template of the generated unique templates of the plurality of title category sets derived from process 300, searches the second plurality of titles by using the generated unique template as a regular expression to match one or more titles with the generated unique template.

In step 406, the template generator or the second application (or one or more other parts of one or more computing devices) performs an action according to the matched one or more titles. In step 408, the action includes associating, in a database, the matched one or more titles with the generated unique template. As shown, if there is a templated generated from process 300 that has not been processed, it will be processed according to steps 404-408. Also, as shown, if all the generated templates have been processed according to steps 404-408, then process 400 ends until another plurality of titles from feeds is received for using the templates generated in process 300.

In some examples, a given title of the second plurality of titles can match multiple generated unique templates of the generated unique templates of the plurality of title category sets, and in such instances the process 400 can further include associating, in a database, the given title with only one of the multiple generated unique templates according to a criterion. The associating of the given title with the only one of the multiple generated unique templates according to the criterion can include selecting the one of the multiple generated unique templates that has been associated, in the database, with more titles than the other templates of the multiple generated unique templates.

Applying DAWG allows representation of each original item name with a canonical form generated by traversing the final graph through a path whose node labels match the item name tokens. For instance, the two items $[t_1\_t_{21}\_t_3\_t_4\_t_{51}]$ and $[t_1\_t_{22}\_t_3\_t_4\_t_{52}]$ can be represented by a common canonical form $t_1\_\{t_{21\_}, t_{22}\}\_t_3\_t_4\_\{t_{51}, t_{52}\}$. This representation is composed of single-word token, followed by an aggregate token of two words, followed by two single-word tokens, and ending in an aggregate token of two words. While the resulting string can represent four different items, only two such items actually appear in the entity and/or product listing. This demonstrates the ability of this approach to embed possibly unseen or rare future entities and/or products. Thus, generating such templates out of the canonical form can provide templates for unseen and possibly future entities and/or products.

Once equipped with DAWG canonicalized templates, the system can match any item to one or more templates. Regular expression matching of the token words can be used. And, in some examples, regular expressions can treat each '*' as a wildcard. In the case of trigram templates, the system tests for a match along a moving window of trigram sequences in a candidate item name. This is less restrictive than end-to-end matching, but suffers from lower precision. In either case, the system bypasses items with two or less tokens.

In some embodiments, a series of tokens $t_k$ can undergo the following transformation: $(\{t_{a1}, t_{a2}\}\text{-}t_b\text{-}t_c\text{-}\{t_{d1}, t_{d2}, t_{d3}\}) \rightarrow [\text{*-}t_b\text{-}t_c\text{-*}]$. A more aggressive alternative is to generate trigram templates with two single-word tokens and one multi-word token, again treating multi-word tokens as wildcards: $(\{t_{a1}, t_{a2}\}\text{-}t_b\text{-}t_c\text{-}\{t_{d1}, t_{d2}, t_{d3}\}) \rightarrow [\text{*-}t_b\text{-}t_c][t_b\text{-}t_c\text{-*}]$. Each of these templates represent a cluster of six items.

In the event that multiple templates match a candidate item, the system can break the tie by taking a template that represents the largest cluster of original items. Also, the system can enforce token-wise equivalence, treating wildcards as expected. In the event that multiple templates match an item, the system can use other tie-breaking schemes as alternatives to the largest cluster canon. For example, a random canon or largest token set intersection canon can be used.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method comprising:
    transforming, via a computing device, a plurality of titles into a trie data structure representing the plurality of titles, the transforming comprising separating words in the plurality of titles into a sequence of nodes of the trie data structure representing each word sequence of each title of the plurality of titles, each node of the trie data structure comprising one word;
    transforming, by the computing device, the trie data structure into a directed acyclic word graph (DAWG) data structure representing each word sequence of each title of the plurality of titles, the DAWG data structure comprising one or more fixed nodes and one or more variable nodes, each fixed node comprising one fixed word, and each variable node comprising a plurality of alternative words representing multiple alternative words for the variable node, the DAWG data structure comprising a canonical form of each title of the plurality of titles; and
    analyzing, by the computing device, a new title based on the DAWG data structure and extracting information from the new title based on the analysis.

2. The method of claim 1, further comprising:
    generating, by the computing device, one or more unique templates based on the DAWG data structure.

3. The method of claim 2, further comprising:
    identifying, by the computing device, at least one of the one or more unique templates matching the new title; and associating, by the computing device, the at least one identified template with the new title.

4. The method of claim 2, generating one or more unique templates based on the DAWG data structure further comprising:
generating, by the computing device, a unique template using two fixed words corresponding to two fixed nodes of the one or more fixed nodes and a number of wildcard parameters.

5. The method of claim 4, the generated unique template comprising one wildcard parameter as the number of wildcard parameters, the generated unique template representing a trigram.

6. The method of claim 4, the generated unique template comprising two wildcard parameter as the number of wildcard parameters, the generated unique template representing a 4-gram.

7. The method of claim 2, wherein the plurality of titles belong to a category set of a plurality of category sets and the one or more unique templates are generated for the category set.

8. The method of claim 1, further comprising:
removing, by the computing device, any duplicates from an initial set of titles to generate the plurality of titles.

9. The method of claim 1, further comprising:
normalizing, by the computing device, the trie data structure by at least removing duplicates in the trie data structure prior to transforming the trie data structure into the DAWG data structure.

10. The method of claim 1, further comprising:
determining, by the computing device, the canonical form of a title of the plurality of titles by traversing the DAWG data structure through a path of node having labels matching the title's contents.

11. A non-transitory computer-readable storage medium tangibly encoded with computer-executable instructions that when executed by a processor associated with a computing device perform a method comprising:
transforming a plurality of titles into a trie data structure representing the plurality of titles, the transforming comprising separating words in the plurality of titles into nodes of the trie data structure representing each word sequence of each title of the plurality of titles, each node of the trie data structure comprising one word;
transforming the trie data structure into a directed acyclic word graph (DAWG) data structure representing each word sequence of each title of the plurality of titles, the DAWG data structure comprising one or more fixed nodes and one or more variable nodes, each fixed node comprising one fixed word, and each variable node comprising a plurality of alternative words representing multiple alternative words for the variable node, the DAWG data structure comprising a canonical form of each title of the plurality of titles; and
analyzing a new title based on the DAWG data structure and extracting information from the new title based on the analysis.

12. The non-transitory computer-readable storage medium of claim 11, the method further comprising:
generating one or more unique templates based on the DAWG data structure.

13. The non-transitory computer-readable storage medium of claim 12, further comprising:
identifying at least one of the one or more unique templates matching the new title; and
associating the at least one identified template with the new title.

14. The non-transitory computer-readable storage medium of claim 12, generating one or more unique templates based on the DAWG data structure further comprising:
generating a unique template using two fixed words corresponding to two fixed nodes of the one or more fixed nodes and a number of wildcard parameters.

15. The non-transitory computer-readable storage medium of claim 14, the generated unique template comprising one wildcard parameter as the number of wildcard parameters, the generated unique template representing a trigram.

16. The non-transitory computer-readable storage medium of claim 14, the generated unique template comprising two wildcard parameter as the number of wildcard parameters, the generated unique template representing a 4-gram.

17. The non-transitory computer-readable storage medium of claim 12, wherein the plurality of titles belong to a category set of a plurality of category sets and the one or more unique templates are generated for the category set.

18. The non-transitory computer-readable storage medium of claim 11, the method further comprising:
normalizing, by the computing device, the trie data structure by at least removing duplicates in the trie data structure prior to transforming the trie data structure into the DAWG data structure.

19. The non-transitory computer-readable storage medium of claim 11, the method further comprising:
determining, by the computing device, the canonical form of a title of the plurality of titles by traversing the DAWG data structure through a path of node having labels matching the title's contents.

20. A computing device comprising:
a processor;
a non-transitory storage medium for tangibly storing thereon program logic for execution by the processor, the program logic comprising:
executable logic for transforming a plurality of titles into a trie data structure representing the plurality of titles, the transforming comprising separating words in the plurality of titles into nodes of the trie data structure representing each word sequence of each title of the plurality of titles, each node of the trie data structure comprising one word;
executable logic for transforming the trie data structure into a directed acyclic word graph (DAWG) data structure representing each word sequence of each title of the plurality of titles, the DAWG data structure comprising one or more fixed nodes and one or more variable nodes, each fixed node comprising one fixed word, and each variable node comprising a plurality of alternative words representing multiple alternative words for the variable node, the DAWG data structure comprising a canonical form of each title of the plurality of titles; and
analyzing logic for analyzing a new title based on the DAWG data structure and extracting information from the new title based on the analysis.

* * * * *